(12) United States Patent
Hooper et al.

(10) Patent No.: US 10,753,689 B2
(45) Date of Patent: Aug. 25, 2020

(54) CONDUIT PIG

(71) Applicant: FIBERBUILT MANUFACTURING INC., Calgary (CA)

(72) Inventors: Michael Hooper, Chestermere (CA); Weng Chee Foong, Calgary (CA); Dan Fletcher, Calgary (CA)

(73) Assignee: FIBERBUILT MANUFACTURING INC., Calgary (CA)

( * ) Notice: Subject to any disclaimer, the term of this patent is extended or adjusted under 35 U.S.C. 154(b) by 238 days.

(21) Appl. No.: 16/068,080

(22) PCT Filed: Jan. 30, 2017

(86) PCT No.: PCT/CA2017/050107
§ 371 (c)(1),
(2) Date: Jul. 3, 2018

(87) PCT Pub. No.: WO2017/127946
PCT Pub. Date: Aug. 3, 2017

(65) Prior Publication Data
US 2018/0363996 A1 Dec. 20, 2018

Related U.S. Application Data

(60) Provisional application No. 62/288,877, filed on Jan. 29, 2016, provisional application No. 62/393,360, filed on Sep. 12, 2016.

(51) Int. Cl.
| | | |
|---|---|---|
| *F28G 1/12* | (2006.01) |
| *B08B 9/055* | (2006.01) |
| *F16L 55/38* | (2006.01) |
| *F16L 55/40* | (2006.01) |
| *F16L 101/12* | (2006.01) |

(52) U.S. Cl.
CPC .............. *F28G 1/12* (2013.01); *B08B 9/0553* (2013.01); *B08B 9/0557* (2013.01); *F16L 55/38* (2013.01); *F16L 55/40* (2013.01); *F16L 2101/12* (2013.01)

(58) Field of Classification Search
CPC ....... F28G 1/12; B08B 9/0553; B08B 9/0557; F16L 55/38; F16L 55/40; F16L 2101/12
See application file for complete search history.

(56) References Cited

U.S. PATENT DOCUMENTS

| | | | |
|---|---|---|---|
| 1,392,105 A | | 9/1921 | Bergesen, Sr. |
| 1,608,347 A | * | 11/1926 | Thompson ............ B08B 9/0553 15/104.17 |
| 2,275,190 A | | 3/1942 | Lowry |
| 2,392,144 A | | 1/1946 | Hall |
| 2,601,614 A | | 6/1952 | Johnson |
| 2,972,156 A | | 2/1961 | Nooy |
| (Continued) | | | |

FOREIGN PATENT DOCUMENTS

| | | |
|---|---|---|
| DE | 2801378 A1 | 7/1979 |
| EP | 2409789 A2 | 1/2012 |

*Primary Examiner* — Weilun Lo
(74) *Attorney, Agent, or Firm* — Bennett Jones LLP

(57) ABSTRACT

An annular seal for a conduit pig includes an annular diaphragm and a separate lead support structure. The annular diaphragm is devoid of internal supports and therefore quite flexible. However, the lead support structure supports the annular diaphragm such that a piston effect can be generated through the annular seal. A brush portion for a conduit pig may include forwardly raked bristles.

16 Claims, 8 Drawing Sheets

(56) References Cited

U.S. PATENT DOCUMENTS

| | | | |
|---|---|---|---|
| 3,107,379 A * | 10/1963 | Hill | B08B 9/0553 |
| | | | 15/104.061 |
| 3,619,844 A | 11/1971 | Collins et al. | |
| 4,016,620 A | 4/1977 | Powers | |
| 5,153,963 A * | 10/1992 | Saxon | B08B 9/0553 |
| | | | 15/104.061 |
| 5,625,917 A * | 5/1997 | Hawkins | B08B 9/0553 |
| | | | 15/104.061 |
| 5,795,402 A | 8/1998 | Hargett, Sr. et al. | |
| 5,903,946 A * | 5/1999 | Collins | B08B 9/051 |
| | | | 15/104.061 |
| 6,014,789 A * | 1/2000 | Knapp | B08B 9/0553 |
| | | | 15/104.061 |
| 8,316,500 B2 | 11/2012 | Freeman et al. | |
| 2007/0151055 A1 | 7/2007 | Chee et al. | |
| 2010/0205757 A1* | 8/2010 | Munden | B08B 9/055 |
| | | | 15/104.061 |
| 2015/0217342 A1* | 8/2015 | Whitsitt | F16J 15/16 |
| | | | 134/166 C |

* cited by examiner

CONDUIT PIG

FIELD

The present invention relates generally to conduit pigs, which are devices for moving through conduits such as pipelines to clean or inspect them. In particular, the invention relates to conduit pig, a conduit pig brush, a conduit pig seal and methods.

BACKGROUND

Most conduits such as pipelines, tubulars, lines and ducts that carry fluids need to be "pigged" at certain times. This is accomplished by inserting a pig into the conduit at a first point and allowing a driver, such as the force of fluids flowing through the conduit, to move the pig through the conduit to a second point where it is caught and removed from the conduit.

Some pigs perform a maintenance or operational pigging function, e.g. cleaning, —such as scraping of solids from the interior of the conduit; swabbing—such as removing liquids or gases from the conduit; batching—such as separating different fluids in the conduit, etc. Some pigs monitor and convey information about a particular condition or performance of the conduit.

Such pigs include extensions of body material to ride against the interior surface of the pipe through which they are conveyed. Body extensions may include foam, rubber seals, bristles of a brush-like structure, etc. Such extensions may act to create a barrier in the conduit for harnessing fluid pressure or dividing two types of fluid and/or may contact the conduit inner wall to measure a wall parameter, provide electrical or magnetic contact between the pig and the wall, centralize the pig in the conduit or scrape against the walls.

SUMMARY

The present invention provides a conduit pig, a pig brush, a seal assembly and methods for conduit pigging.

In accordance with one aspect of the present invention, there is provided a seal for a conduit pig comprising: a body, and an annular seal assembly encircling the body, the annular seal including an annular diaphragm having a front side and a rear side and a lead support bearing against the front side of the annular diaphragm. In accordance with another aspect, there is provided a conduit pig including this seal.

In accordance with yet another aspect, there is provided a method for pigging a conduit comprising: radially compressing a conduit pig, the conduit pig including a central pig body; an annular seal encircling the central pig body, the annular seal including an annular diaphragm having a front side and a rear side and a lead support bearing against the front side of the annular diaphragm; pushing the conduit pig into the conduit with the annular diaphragm urged into a conical shape about the central pig body and the lead support overlying and positioned radially outwardly of the annular diaphragm; and applying fluid pressure behind the conduit pig to inflate the diaphragm against the lead support and thereby to push the conduit pig through the conduit.

In accordance with yet another aspect, there is provided a conduit pig comprising: a body with a leading end; and a plurality of bristles on the body, the plurality of bristles extending out from and encircling the body, wherein at least some of the bristles are raked forwardly toward the leading end.

In accordance with another aspect, there is provided a method for pigging a conduit using a conduit pig including a body with a leading end, a plurality of bristles on the body, the plurality of the bristles extending out from and encircling the body, wherein at least some of the bristles are raked forwardly toward the leading end, the method comprising: inserting a conduit pig into a conduit with the leading end first and the plurality of bristles radially compressed within the conduit with at least some of the plurality of bristles angled towards the leading end; and pushing the conduit pig through the conduit.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the claim scope of the present invention. Accordingly the drawings and detailed description are to be regarded as illustrative in nature and not as restrictive.

BRIEF DESCRIPTION OF THE DRAWINGS

Referring to the drawings, several aspects of the present invention are illustrated by way of example, and not by way of limitation, in detail in the figures, wherein.

DETAILED DESCRIPTION OF VARIOUS EMBODIMENTS

Figure 1:
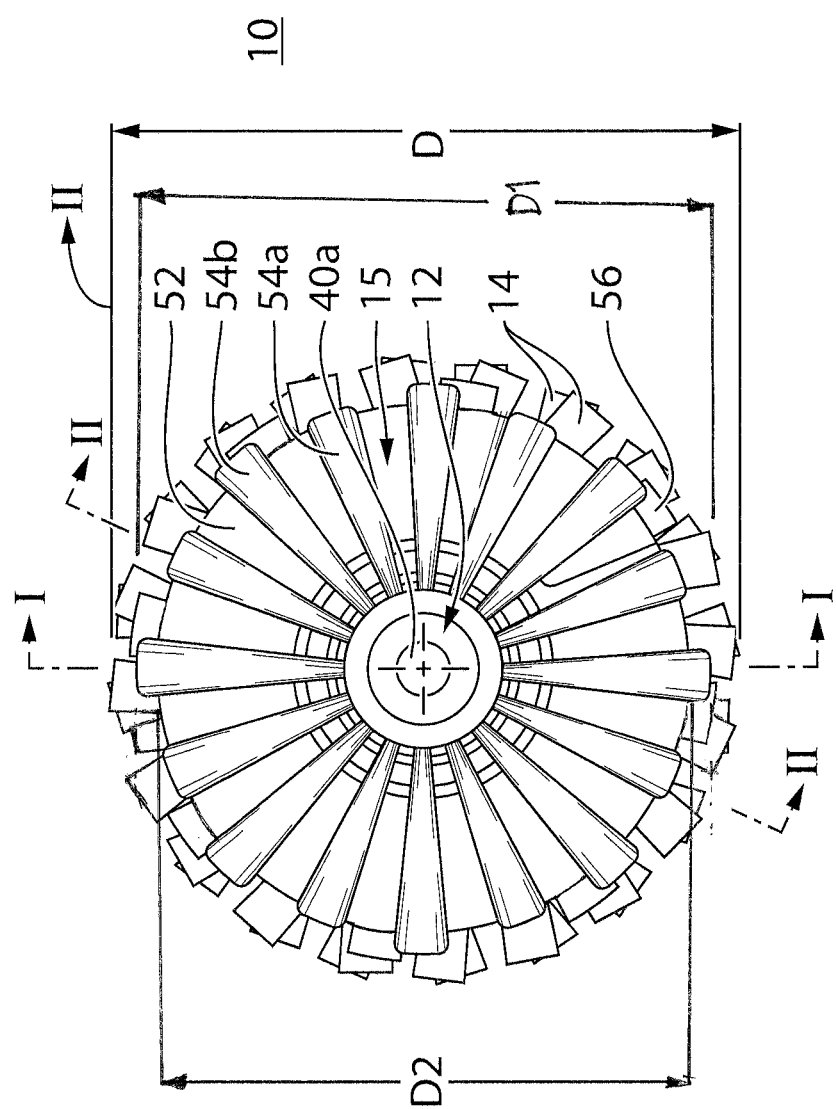
FIG. 1 is a front, end view of a conduit pig according to the present invention.

The description that follows, and the embodiments described therein, is provided by way of illustration of an example, or examples, of particular embodiments of the principles of various aspects of the present invention. These examples are provided for the purposes of explanation, and not of limitation, of those principles and of the invention in its various aspects. In the description, similar parts are marked throughout the specification and the drawings with the same respective reference numerals. The drawings are not necessarily to scale and in some instances proportions may have been exaggerated in order more clearly to depict certain features.

Reference will now be made to the Figures, which show an embodiment of a conduit pig 10. Such a pig 10 may include a core body 12 and one or more annular fluid seals 15. Pig 10 may also include a brush portion 13 on core body 12.

The pig is useful in conduits such as pipelines, ducts, lines, or other tubular members that may be of any cross-sectional shape. The annular fluid seal and the pig brush has application in conduits with non-circular and circular cross-sectional shapes.

While the body 12 is shown as an elongate, cylindrical structure with a long axis x extending between a leading end and a trailing end, it may take other forms such as rounded or polygonal (i.e. square, triangular, octagonal, irregular, etc.), etc. The body may, as shown, include a substantially central mounting aperture 40 for permitting the mounting of the conduit pig 10 on a tool mandrel 40a. The tool mandrel may be a portion of the conduit pig that retains the brush portion and the seals. For example, the tool mandrel may be similar to a rod that extends through aperture 40 and holds the pig components together and/or to other components. The mandrel may be secured to the pig by fasteners, welding, clamping, etc.

The brush portion 13 includes brush bristles 14 arranged to encircle the body (i.e. encircle continuously or intermittently the long axis) and are configured to support the pig centrally inside a pipe and to drag along the pipe inner wall to clean it or to make monitoring contact. The brush bristles can be installed in various ways, but in this illustrated embodiment, the plurality of brush bristles 14 are arranged as a plurality of tufts of bristles, each tuft is installed with its base in a recess 30 in the body and its exposed length extending out from the recess beyond the outer surface 12 of the body.

While the bristles may extend in various orientations, in this illustrated embodiment, the bristles extend substantially orthogonally relative to the long axis x of the body but non-radially, for example, with the centerline axis $x_b$ of the bristles extending substantially orthogonally to, but not intersecting, the long axis x of the body. Stated another way, non-radially means that the bristles are angled secantially (i.e. with the bristle axis oriented as a secant) relative to the body outer surface 12 or other concentric structure about long axis x of the body. All the bristles may be angled in the same direction. Such a directionally uniform, non-radial, angled orientation may induce the pig to rotate as it transits the conduit. Alternately, some bristles may be angled in a clockwise direction and some may be angled in a counter-clockwise direction. In one embodiment, the tufts of bristles 14 are positioned in rings about the circumference of the body and the rings are spaced along the length of the body with some rings extending as a secant relative to the long axis of the body and angled clockwise and other, interposed rings of tufts extending as a secant relative to the long axis of the body and angled counter-clockwise.

The body includes one or more recesses 30 to accommodate the tufts of brush bristles 14. The recesses may take various forms, for example, to accommodate one or more than one tuft. For example, in the illustrated embodiment, body 12 includes a plurality of recesses 30, each of which are small, cylindrically shaped and spaced apart and sized to only accommodate one tuft of bristles. The cylindrical side walls of each recess defines therewithin a central axis $x_r$ extending from the base of the recess to the opening of the recess on the outer surface of the body.

The plurality of recesses 30 in the illustrated embodiment, are spaced according to the desired arrangement of bristles for the pig. The arrangement of the recesses on the body generally dictate the arrangement of tufts of bristles 14.

Because the recesses 30 act to accommodate the bristles 14 in the body, the recesses 30 can be formed to hold the brushes firmly in various orientations. For example, recesses 30 may be formed with their center axis $x_r$ extending orthogonally from a radial line r relative to center axis x such that the brush bristles 14 are shown extending out radially from the body. However, recesses 30 can be formed to hold the brushes offset from a radially extending position, if desired. As such, in the illustrated embodiment, the recesses are formed in the body with their central axes $x_r$ non-radially orientated, for example, example substantially orthogonally and extending as a secant relative to the long axis of the body.

While the tufts are shown as pencil brushes the brushes may be take other forms such a flat, continuous, etc. in which case the recesses may be polygonal including square, triangular or rectangular in section, long slots, helical openings, openings between orthogonal sections of the body, etc. Regardless, the long axes of the recesses may still be oriented to dictate the orientation of the bristles extending therefrom.

The bristles 14 may be formed of various materials, depending on a number of factors including the conduit material, the nature of the fluid within the conduit (corrosive, etc.) and their desired activity (i.e. conductivity, gentle cleaning, aggressive cleaning, etc.).

Seal 15 acts as a piston-type driver for the pig by capturing fluid pressure in the conduit and generating a pressure differential across the seal to move the pig through a conduit in which it is installed. Each seal 15 is composite including an annular seal member and a separate support, positioned alongside the annular seal member to support it. In one embodiment, there is a support on the front side of the annular seal member. In another embodiment, there is a support on each of the front side and the rear side of the annular seal member. For example as illustrated, seal 15 may including an annular seal member 52 and the supports include a lead support 54 between member 52 and the leading end and a trailing support 56 between member and the trailing end, as will be described hereinafter.

In the illustrated, the annular seal member is a diaphragm 52 formed of sheet material. The annular seal may be free of incorporated, embedded support structures and may by resilient, flexible and substantially non-self-supporting. In one embodiment, the diaphragm may in fact be so collapsible that it cannot hold its own shape against gravity. As such, the annular seal is extremely compressible such that it can be compressed to fit into a small diameter conduit for pigging operations, but is resilient and capable of reforming to its non-compressed diameter when free of the surrounding, constricting diameter of the diameter and when biased outwardly by the separate supports 54, 56.

The diaphragm 52 is annular and is installed to encircle the long axis, extending circumferentially about body 12. Diaphragm 52 includes a front side and a rear side and is formed by one or more layers 52a, 52b (two layers are shown here) of resiliently, flexible sheet material such as sheet form rubber, synthetic rubber, urethane, neoprene, leather, etc. One sheet material has properties of both elasticity and plasticity. The sheet material useful for diaphragm 52 may have a substantially consistent thickness between the diaphragm's front side and rear side across its entire area from its base to its outer edge. The sheet diaphragm material provides for the separation and isolation of the fluids between the front side and the back side of the diaphragm assembly. This sealing (separation and isolation of fluids) is achieved when the diaphragm is supported and possibly captured and shaped by the one or more structural support elements 54 of the seal assembly. While the diaphragm may be thin sheet material, non-self-supporting and resiliently flexible, it may function due to the adjacent supports that capture, support and shape the diaphragm.

Each layer of diaphragm 52 may be formed from a continuous, or c-shaped annular piece of sheet material. Alternately, each layer of diaphragm 52 may be piecewise, formed from a plurality of segments, such as segments of a ring or a plurality of radial segments (i.e. petals) installed to form a ring. In a c-shaped or piecewise construction, adjacent segments may overlap or interlock or be positioned side-by-side to abut along their edges. In one embodiment, each diaphragm 52 may be petalled such as by creating scallops or slots therein to improve the diaphragm's collapsibility to assume a conical shape.

Diaphragm 52 is installed on the body to encircle and extend out from the body. Diaphragm 52 may extend out along an orthogonal plane or be directed to have a generally conical shape. In one embodiment, before installation to form the seal, the material of diaphragm 52 is generally flat, but is shaped, for example, to be conical as by pressing, folding, pleating, clamping or otherwise shaping for or during installation on the body. Diaphragm 52 may be installed by a mounting ring on or as a subcomponent of body 12. The mounting ring includes two ring sides 58*a*, 58*b* between which the diaphragm is secured. The ring sides each include a base ring installed in the body and edges extending from the base ring. The edges may be deflected such that overall one side of the mounting ring is concave and the other is convex such that when fit together with the diaphragm between them, the diaphragm is urged into a conical shape. The outer edges may be rounded to avoid a sharp edge on the mounting ring, as this edge may bear against the unsupported seal protruding from the mounting ring. The mounting ring may secure the diaphragm such as by one or more of clamping, fasteners, adhesives, welding, interlock, etc.

While the seal member supports 54, 56 are separate from the annular seal member, the supports are connected to the body and are in contact with the annular seal member 52 to support it in an annularly protruding position relative to the body 12.

Since the support is anchored to, and extends radially out from, the body, the flexible annular seal is held by at least the front side or lead support 54 in an operative position extending radially out from the body. The supports are biased to extend substantially radially out from the body and thereby bias the diaphragm into a substantially radially extending position.

The support may be formed of metal such as steel or non-metal materials such as rigid plastic, etc. and is positioned to extend annularly out from the body alongside and in contact with the diaphragm. While the support may have an overall material strength greater than the diaphragm, the support is also resiliently flexible, as it can flex to be compressed in a conduit. The support, therefore, normally is biased to extend out from the body with a diameter greater than that of the body. However, the support can be resiliently radially compressed, as by compressing the support radially back toward the core body 12 into a conical form. In one embodiment, the support includes only a lead support and in some embodiments, the support also includes a trailing support. The supports are in contact with the diaphragm, but are not embedded or physically connected directly to the diaphragm. The support structures may be made by one or more of rings, conical plates, conical segments, fingers, brush bristles, or any other support materials connected to the main body and providing a resiliently flexible, support and alignment structure for the diaphragm. The flexible supports will conform to the shape of the inside of the conduit and any defects or irregularities and provide the annular support and centralization for the diaphragm seal. In the illustrated embodiment, there is both a leading support and a trailing support and each are brushes secured at their bases to the body 12 and configured to extend outwardly from the body to form a circumferential brush array about the body positioned to be in close alongside and likely in contact with the diaphragm. As will be appreciated, each brush includes bristles and it is the bristles that are secured at their bases to the body 12 and configured to extend outwardly from the body extend in contact with the diaphragm.

In the illustrated embodiments, the supports include a brush array forming lead seal support 54 and a brush array forming trailing seal support 56. Lead and trailing seal supports 54, 56 support the diaphragm 52 in its annularly extending position about body 12. Lead and trailing supports 54, 56 are positioned close alongside and possibly bearing against the diaphragm on each side thereof, with the lead support 54 bearing against the diaphragm on one side and the trailing support 56 on the other side. In this way, while diaphragm 52 may be very thin and flexible, it is sandwiched between supports 54, 56 in an annularly extending position and supports 54, 56 maintain the diaphragm against folding over on itself.

Each brush array forming a support 54, 56 has an annular arrangement of bristles, which is installed on body to encircle the body. While herein the arrays are described generally as extending outwardly, for example, substantially radially outwardly, it is to be understood that the arrays may not only be purely radially arranged. For example, the supports may be oriented orthogonally or non-orthogonally, with bristles extending directly radially or extending non-radially (i.e. angled secantially, raked forwardly or rearwardly or combinations thereof for example as described above with respect to brush portion 13), relative to axis x of the body.

The bristles forming the brush arrays may be arranged and installed in many ways. In the illustrated embodiments, the bristles are installed as tufts in recesses. The orientation and spacing of the recesses determine the orientation of the tufts and the orientation of the tufts define the overall shape of the supports.

Figure 2:
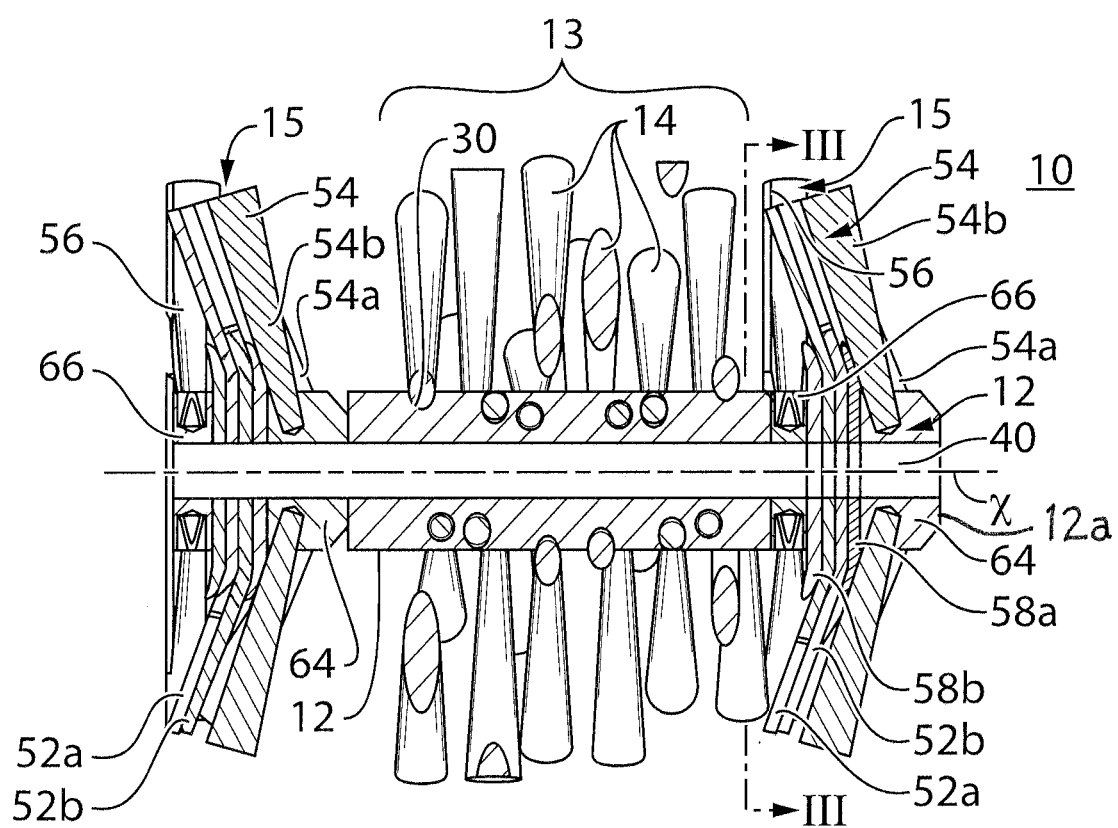
FIG. 2 is a sectional view along line I-I of the conduit pig of FIG. 1.
Figure 3:
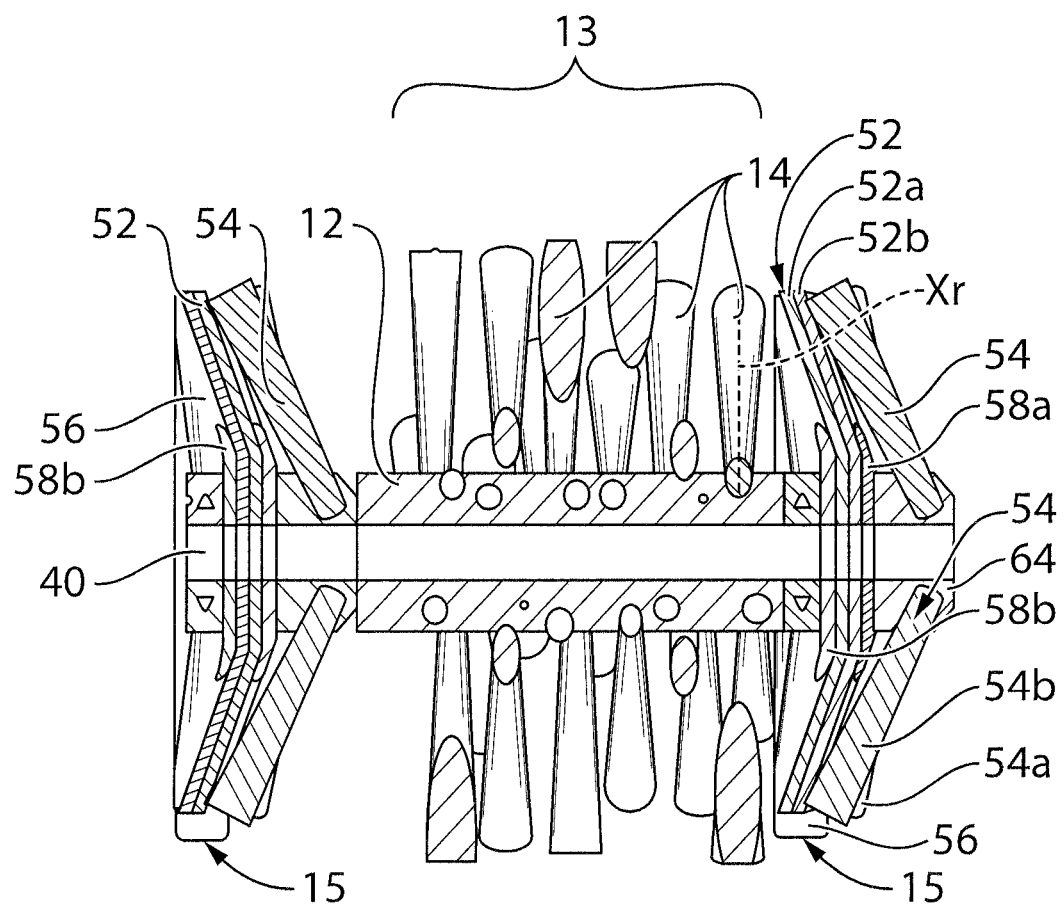
FIG. 3 is a sectional view along line II-II of the conduit pig of FIG. 1.
Figure 4:
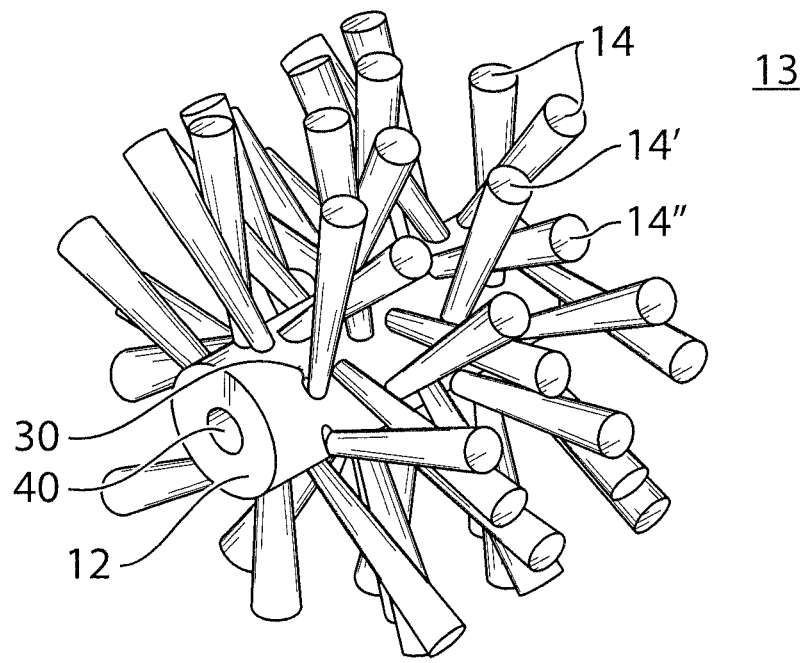
FIG. 4 is an isometric view of a brush portion useful in a conduit pig.
Figure 5:
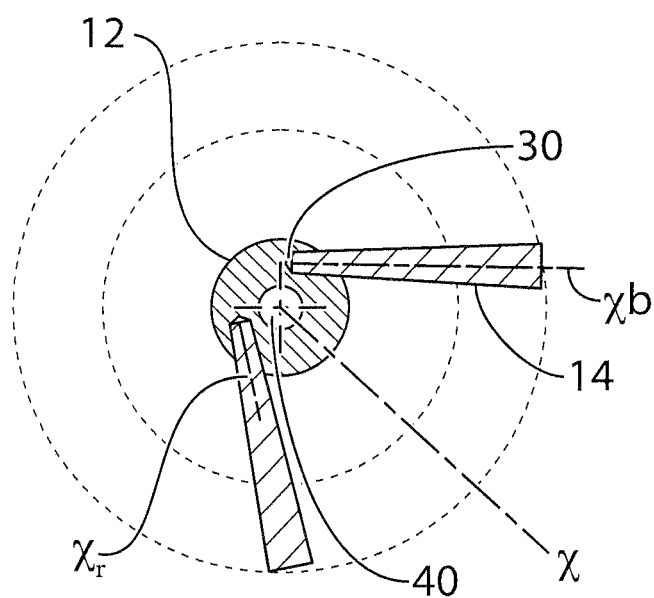
FIG. 5 is a section along line of FIG. 4.
Figure 6:
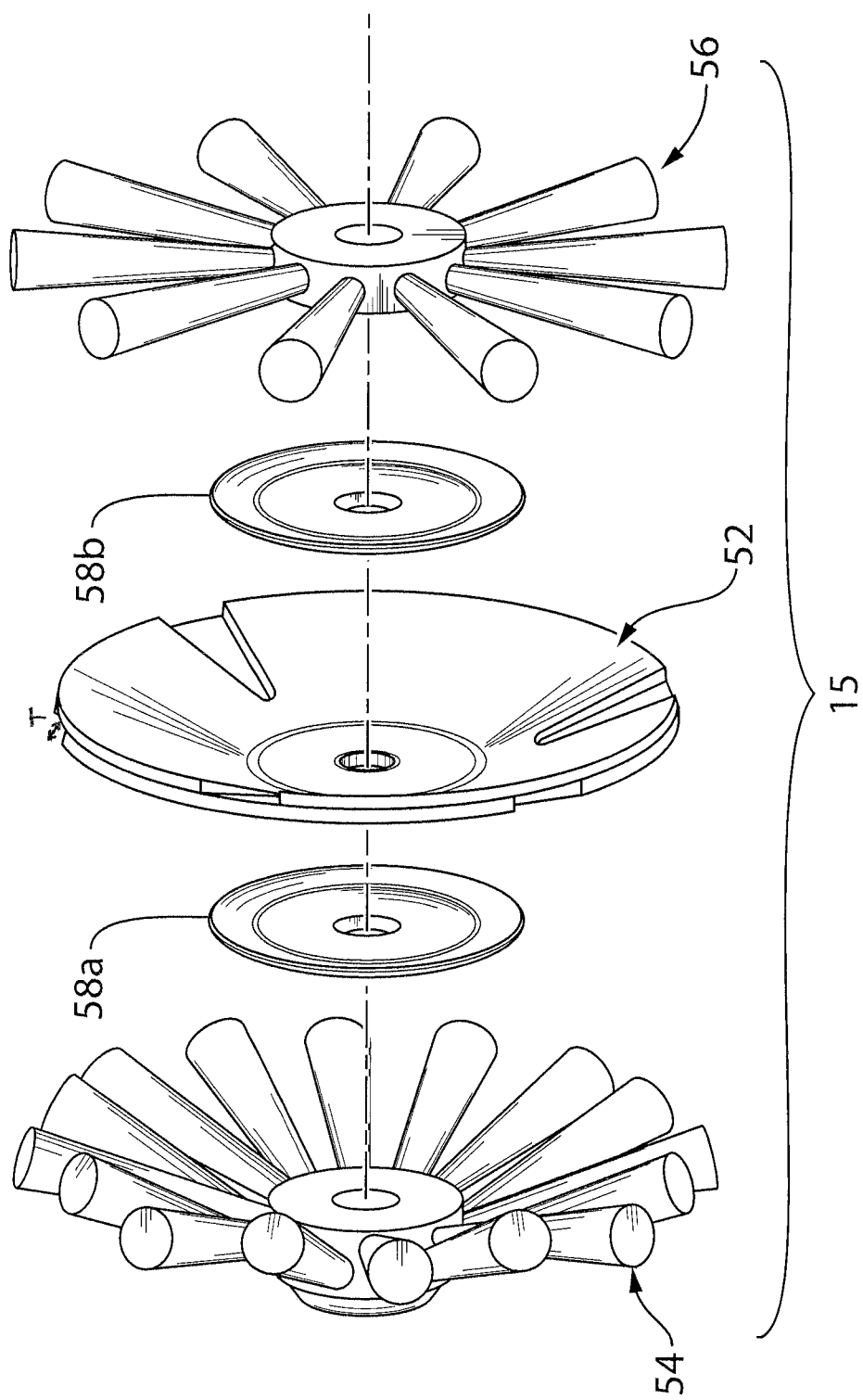
FIG. 6 is an exploded view of a seal useful in a conduit pig.

For example, a brush array may include brush bristles extending straight out, purely radially or extending out non-radially, for example, oriented to be swept clockwise or counter clockwise circumferentially (i.e. angled secantially and/or raked forward or rearward). As an example, supports 56 in FIGS. 1 and 2 are brush arrays including tufts with their bristles extending straight out: radially and orthogonally, while lead supports 54 in FIGS. 1 and 2 are brush arrays including tufts with their bristles extending radially, but non-orthogonally. In particular, the bristles of supports 54 are angled, for example raked rearwardly relative to axis x toward the diaphragm, such that the overall support brush array has a conical shape angled away from the leading end 12*a* of body 12. This array 54 bears against diaphragm and urges it into a conical shape.

Lead support 54 in this embodiment has alternating angling (i.e. raking) of the brushes about the circumference such that the overall shape of the annular brush array is conical but corrugated (or fluted) having alternating ridges and grooves that extend out radially from the body. To accomplish this, spaced portions, tufts 54a, of the array extend at one raking angle relative to axis x and portions, tufts 54b, in between extend at another angle. In particular, considering the embodiment with array 54 formed from a plurality of bristle tufts, a plurality of the recesses in body 12 for accommodating the tufts may be angled at one angle and interposed recesses may be angled at another angle.

The bristles forming the brush arrays of supports 54, 56 may be formed of various materials such as metal for example brass or steel or polymers, depending on a number of factors including the conduit material, the nature of the fluid within the conduit (corrosive, etc.). However, at least lead support 54 may also be selected to affect the forces applied, such as drag, by the seal to the conduit wall, as the conduit pig moves therethrough. For example, the lead support may beneficially selected with consideration as to their flexibility and drag coefficient relative to the conduit inner wall material, such that the bristles are resilient to be able to flex back against the conduit wall and have a drag properties to reduce drag forces relative to the material of the conduit. In one embodiment for a metal pipe such as of steel, the bristles forming lead support 54 are formed of metal wire, such as of steel.

While the body may be one piece, in the illustrated embodiment, body 12 is formed of a plurality of subcomponents held together, for example, with a mandrel 40a extending through and secured in aperture 40. For example, seals 15 and brush portion 13 may each be installed on separate subcomponents to facilitate construction and permit unique arrangements of seals and brush bodies. In another embodiment, the body may be formed as a cylinder formed of a plurality of side plates having tufts 14 installed therein forming the side walls of the cylinder and that are held together in a cylindrical form. This is, for example, useful for large diameter applications. In another embodiment, seals 15 are each formed of a plurality of subcomponents held together, for example, a trailing brush body ring 66, mounting ring parts 58a, 58b with diaphragm 52 held between, and lead brush body ring 64, all of which may be aligned and held together by mandrel 40a.

In use, conduit pig can be installed in a conduit such as a pipe with the lead support inserted first, ahead of the diaphragm. When the pig is driven through the conduit, the lead support then moves ahead of the diaphragm and fluid pressure captured by the diaphragm creating a pressure differential that may inflate the diaphragm and push it against the lead support to thereby push the pig through the conduit.

Figure 7:
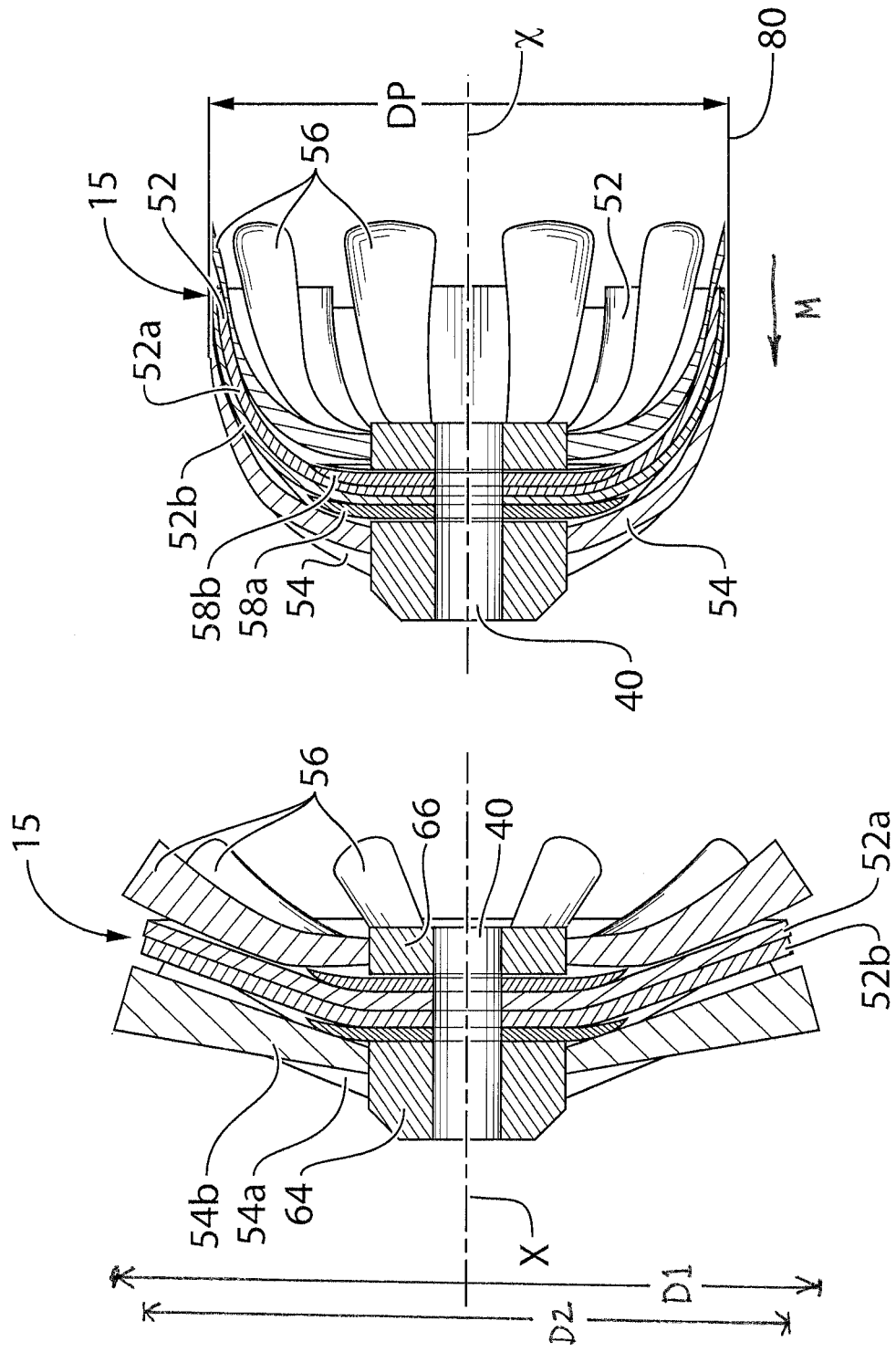
FIGS. 7A and 7B are sectional views through a seal, where the seal in FIG. 7A is in a neutral, non-compressed condition and in FIG. 7B is in a compressed condition within a pipe.

The overall, uncompressed diameter D of the pig is defined by the diameter at the longest bristles, measured through the center axis x. The lead support 54 has a diameter D1 and the diameter D2 of annular diaphragm 52 is the same or possibly, as shown, less than D1 (FIGS. 1 and 7A). The diameter of body 12 is less than a conduit inner diameter DP (FIG. 7B) into which the pig is to be installed, but the overall diameter D is equal to or greater than or the pipe inner diameter DP. The diameter D1 is also equal to or greater than or the pipe inner diameter DP. This pig actually can have an overall diameter significantly greater than the pipe inner diameter because of the flexibility of the seals 15 and the compressibility of the supports 54, 56 and brush portion 13, especially if non-radial, raked and/or secantial bristle arrangements are used for portion 13 and the supports. For example, FIG. 7A shows a seal 15 for a pig in a non-compressed, neutral condition and FIG. 7B shows the seal compressed within a pipe 80 ready to be moved along a direction, as indicated by arrow M. At the same time, these features give the pig excellent wall contact and permit the bristles to penetrate deeply into any pits in the pipe wall.

Also, by selecting D1>D2, the lead support for the seal may tend to ride along the pipe wall, while the diaphragm rides within the lead support. In such a configuration, the lead support protects the diaphragm from wear against the conduit inner wall and the lead support also reduces frictional forces by maintaining spacing between the material of the diaphragm and the material of the conduit inner wall. As noted above, material selection for the lead support can consider durability, durometer, drag coefficient, diameter, flexibility etc. to influence the drag characteristics and degree of contact of the lead support relative to the conduit. For example, where a conduit is formed of metal, a metal, such as steel, lead support may be selected over a polymeric lead support, since the drag characteristics of steel against metal may be less than the drag characteristics of polymer against metal. For example, the lead support may be formed of stiff, but resiliently flexible, bristles such as those made of steel wire. In another embodiment, a lead support 54 with a friction reducing coating may be employed to reduce drag.

The supports also function to permit the seal assembly to expand and collapse as irregularities are encountered on the inside walls of the pipe. As the supports, bias out into or are compressed to pass any irregularities in the pipe wall, the diaphragm is biased to follow the compression, and/or will inflate to follow the expansion, of the supports. Irregularities can be any interruption or non-continuity to the inside surface of the pipe including but not limited to corrosion, dents, welds, valves, flanges, changes in pipe diameter and changes in wall thickness.

Seal 15 permits and pig 10 benefits from the use of bypass flow, which is a controlled and metered flow of fluid from behind the pig to the front of the pig either through the body of the tool or past the seal assemblies. Bypass flow is a useful feature that will improve the cleaning effectiveness in particular but also will permit the use of more advanced features such as hydraulic jetting. In one embodiment, diaphragm 52, when compressed in a pipe, is configured to fill most of the inner diameter, but be out of contact with pipe wall such that a small clearance remains between the pipe wall and the diaphragm. Bypass can occur through this small clearance. The clearance can be obtained by selecting lead support to be longer than diaphragm (D1>D2), such that the lead support 54 rides between the diaphragm and the conduit wall, when the pig is compressed and moving through the conduit.

The conduit pig may be employed for separating introduced fluids from existing fluids, for cleaning or for inspection of the conduit. The inspection may be by camera, electromagnetic, acoustic or other remote or connected signalling.

The fluid in the conduit and conveying the pig may be gas, liquid or combinations thereof.

Figure 8:
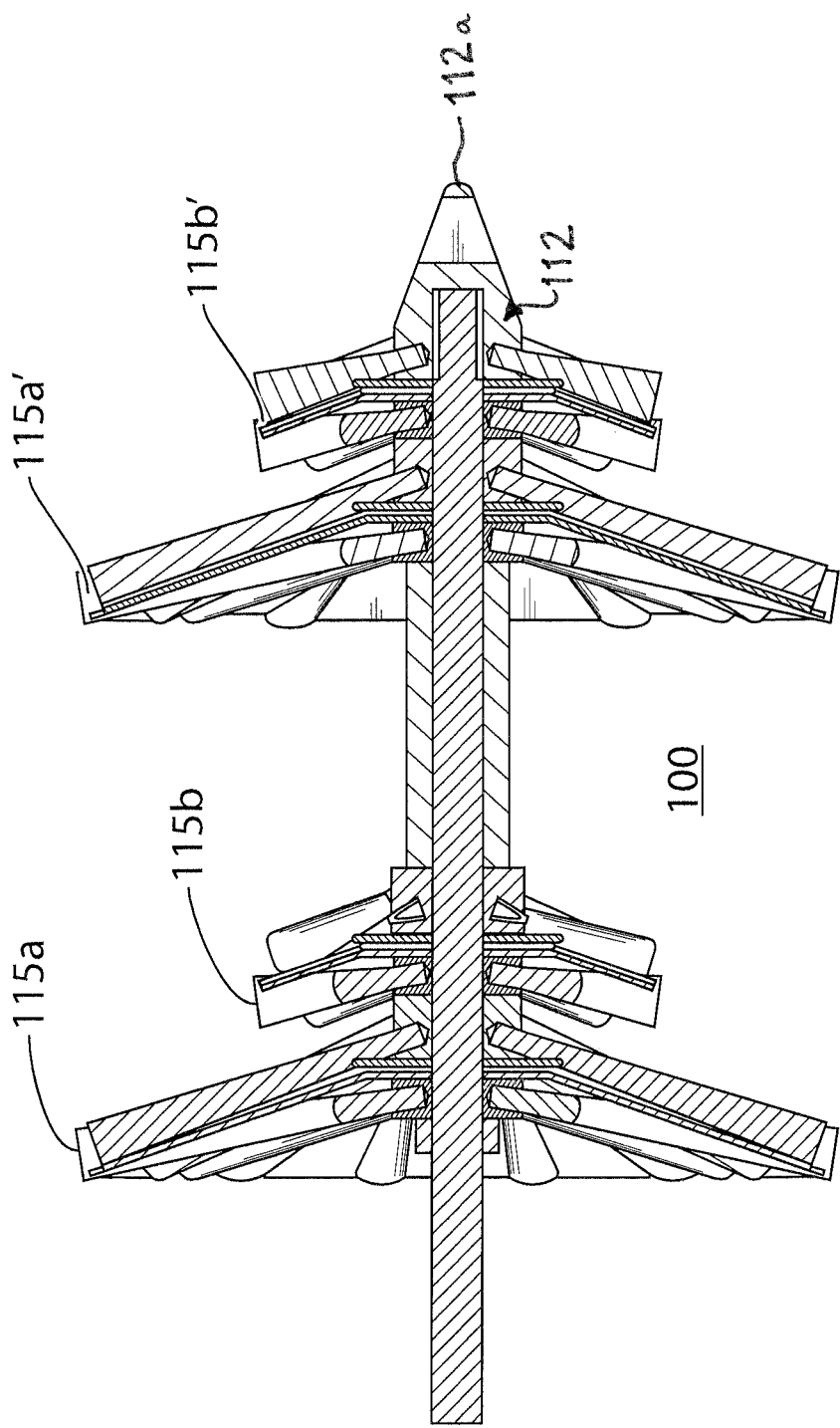
FIG. 8 is a side elevation of a conduit pig.

Another conduit pig 100 is shown in FIG. 8, which includes multiple seal arrays 115a, 115b, 115a' and 115b' on body 112. Seal arrays 115a, 115a' have a larger diameter than seal arrays 115b, 115b'. A pig with two seal array diameters may be useful to ensure that the conduit pig 100 can move from small diameter to large diameter pipes and effect a seal in each sized pipe. While larger diameter seals 115a, 115a' may be useful in very small diameter pipes, they may tend to be collapsed and compressed to such a degree that they no longer create a seal effective to capture and be moved by fluid pressure. The smaller diameter seals may be positioned ahead of, closer to the pig's leading end 112a, relative to the position of a larger diameter seal 115a, 115a'.

Smaller diameter seals, therefore, work better in smaller diameter pipes. The seal arrays and the body are according to one of the various embodiments described above. The seal array and a pig formed therefrom may be used according to the methods described above.

It will be appreciated, therefore, that in a seal assembly as described in FIGS. 1 to 8, comprising a diaphragm and a separate structural support for the diaphragm, the structural support provides the force, structure and shape to cause the sealing diaphragm to rebound and regain its original in-service deformed shape after a significant change in the shape or size of the conduit inner wall is encountered. The seal assembly may provide a positive seal contact through a very wide range of pipe inside dimensions by providing a dimensionally stable seal through the use of semi-rigid structural support elements separate from the pliable annular sealing diaphragm.

The seal assembly is resiliently flexible and can conform to any irregularities in the inside surface of the conduit. As such, the seal assembly can be radially compressed to a diameter less than the conduit diameter in which the pig is to be introduced for pigging. However, once introduced, the seal assembly will rebound as by the resilience of the lead support and the diaphragm to fill the inner diameter of the conduit. Therefore, the seal assembly of the present invention, in use, has a final deformed and in-service shape as determined by the size and shape of the inside surface of the conduit in which it is introduced for pigging. Also, after passing an irregularity or diameter restriction in the conduit inner diameter, the seal assembly rapidly rebounds to the maximum shape possible inside the conduit to maintain positive sealing action through irregularities in the conduit inner surface, and thereafter when such irregularities are transited and no longer acting on the seal assembly.

The pig and its seal assembly may reduce the damage to the inside surface or applied coating of any conduit due to the reduced applied wall forces from the seal assembly. The applied wall forces may be reduced to protect and prevent damage to fragile or soft conduit materials. The seal assembly reduces the drag forces on the pig by reducing the wall forces applied between the seal to the inside of the pipe. The reduced drag forces on the pig are achieved since it is the front support that rides/slides along the conduit inner wall, rather than the annular seal. The front support can be selected to be a low-friction material relative to the conduit inner wall.

When compared to a pig where the sealing cup or member rides along the conduit wall, the present pig experiences less sticking and surging as it travels through the conduit inner diameter by reducing and smoothing the drag forces encountered, particularly, at any irregularities in the conduit inner surface.

The current pig is customizable by using reconfigurable structural and sealing elements and materials to provide pigging seals. As such the best materials and diameters can be selected considering the presence of aggressive chemical or temperature environments or the conduit media.

Figure 9:
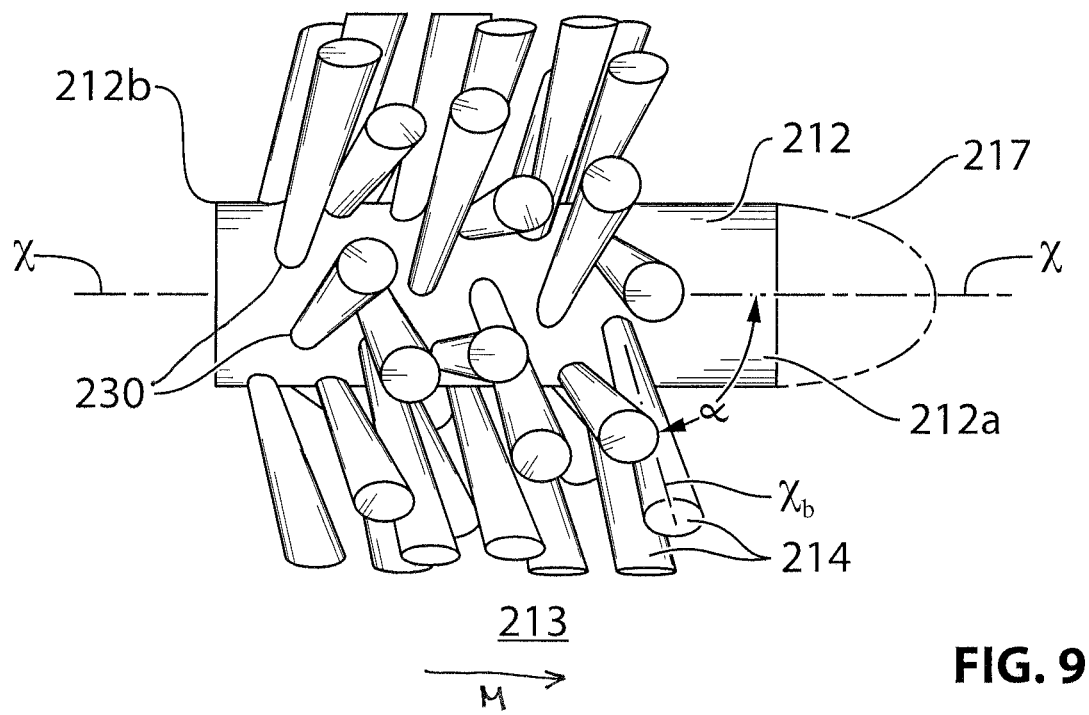
FIG. 9 is side elevation view of a brush portion for a conduit pig.
Figure 10:
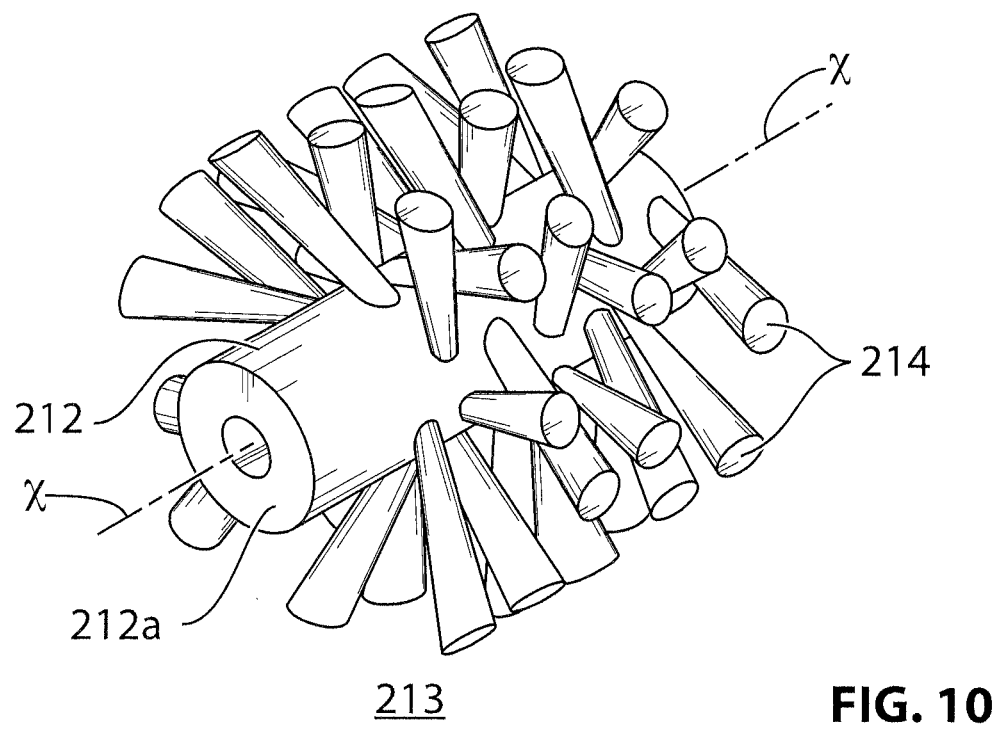
FIG. 10 is a front isometric view of the brush portion of FIG. 9.

While a pig brush portion 13 is illustrated in FIGS. 1 to 5, another pig brush portion 213 is illustrated in FIGS. 9 and 10. Pig brush portion 213 has been invented for use with or without the seal assembly described above. The brush portion 213 includes brush bristles, herein installed as tufts 214 on a central body. The tufts 214 are positioned to encircle long axis x of central body 212. Bristle tufts 214 are configured to support the pig centrally inside a conduit and to drag along the pipe inner wall to clean it or to make monitoring contact with the pipe inner wall.

In this illustrated embodiment, at least some bristle tufts 214, and thereby the bristles in the tufts, extend from body 212 and are angled substantially forwardly toward a leading end 212a of the body. Leading end 212a is either formed as or, as shown, has connected thereto a nose 217 defining the leading end of the pig. Nose 217 is generally rounded and/or has a tapering diameter.

As such, bristle tufts 214 do not extend rearwardly toward trailing end nor do they extend orthogonally relative to the long axis x of the body. Instead, bristle tufts 214 are raked forwardly toward leading end, as defined by nose 217. As such, centerline axis $x_b$ of the bristles extend out from the body at a forwardly canted angle α of less than 90°, for example less than 80° relative to long axis x of the body.

In addition, bristle tufts 214 may be radially oriented or, as shown, non-radially, for example, with the centerline axis $x_b$ of the bristles extending out from the body, but not intersecting, the long axis x of the body. Stated another way, non-radially means that the bristles are angled secantially (i.e. with the bristle axis oriented as a secant as described above) relative to the outer surface of body 212 or other concentric curvature about long axis x of the body. All the bristles may be angled in the same direction clockwise or counter-clockwise about the body. Such a directionally uniform, non-radial, angled orientation may induce the pig to rotate as it transits through the conduit. Alternately, as shown, some bristles may be angled in a clockwise direction and some may be angled in a counter-clockwise direction. In one embodiment, the tufts 214 of bristles are positioned in rings about the circumference of the body and spaced along the length of the body with some rings extending as a secant relative to the long axis of the body and angled clockwise and other rings of tufts extending as a secant relative to the long axis of the body and angled counter-clockwise. The clockwise raked bristle rings may alternate with the counter-clockwise raked bristle rings.

In this illustrated embodiment, the plurality of brush bristle tufts 214 are arranged as a plurality of tufts of bristles, each tuft is installed with its base in a recess 230 in the body and its exposed length extending out from the recess beyond the outer surface of the body 212.

The body includes one or more recesses 230 to accommodate the tufts of brush bristle tufts 214. The recesses may take various forms, for example, to accommodate one tuft or more than one tuft. For example, in the illustrated embodiment, body 212 includes a plurality of recesses 230, each of which are small, cylindrically shaped and spaced apart and sized to only accommodate one tuft of bristles. As described above with respect to FIG. 5, the cylindrical side walls of each recess define therewithin a central axis extending from the base of the recess to the opening of the recess on the outer surface of the body.

The plurality of recesses 230 in the illustrated embodiment, are spaced according to the arrangement of bristles desired for the pig. The arrangement of the recesses on the body generally dictate the arrangement of tufts of bristle tufts 214. Because the recesses 230 act to accommodate the bristle tufts 214 in the body, the recesses 230 can be formed to hold the brushes firmly in various orientations. For example, recesses 230 may be formed with their center axis angled forwardly relative to center axis x such that the bristle tufts 214 extend out angled toward the leading end of the body. As such, in the illustrated embodiment, the recesses are formed in the body with their central axes non-orthogonally and non-radially orientated, for example, angled forwardly and extending as a secant relative to the long axis of the body.

While the tufts are shown as pencil brushes the brushes may be take other forms such a flat, fan-shaped, etc. in which case the recesses may be square, triangular, rectangular, slot-shaped, etc., in section. Regardless, the long axes of the recesses may still be oriented to dictate the forward raking and radial or non-radial orientation of the tufts extending therefrom.

In use, a conduit pig with pig brush 213 can be installed in a conduit with the leading end 212a of the body inserted first, followed by the trailing end 212b. The brush is selected to have a diameter at least as large as, and likely larger than, the inner diameter of the conduit. The brush bristles are therefore compressed within the conduit inner diameter and generally are bent and tufts splayed to fill the inner diameter with body 212 generally centralized in the conduit. Some bristles, when compressed, are bent forwardly such that when pig brush 213 moves, arrow M, through the conduit the tips of some bristles ride along the conduit wall ahead of the bases of those bristles. The pig can then be moved through the conduit with the leading end advancing ahead of the bristle tufts 214. The bristles, being forwardly raked, tend to be driven forwardly into the depth of pits and other irregularities, rather than riding over them.

A conduit pig such as that shown in FIG. 2 may include a brush portion with at least some bristles forwardly raked.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the scope of the claims. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

We claim:

1. A conduit pig comprising:
    a body; and
    an annular seal assembly encircling the body, the annular seal including:
        an annular diaphragm having a front side and a rear side;
        a lead support bearing against the front side of the annular diaphragm and having a diameter greater than a diameter across the annular diaphragm to protect the annular diaphragm from wear against a conduit inner wall during use; and
        a trailing support bearing against the rear side of the annular diaphragm, to thereby support the annular diaphragm between the lead support and the trailing support.

2. The conduit pig of claim 1 wherein the annular diaphragm has a base attached to the body and an outboard edge and wherein the annular diaphragm is a sheet material having a substantially consistent thickness from the base to the outboard edge.

3. The conduit pig of claim 1 wherein the lead support and the trailing support each have a rigidity greater than the annular diaphragm.

4. The conduit pig of claim 1 wherein the lead support pushes against the annular diaphragm and resiliently deforms the annular diaphragm into a conical shape.

5. The conduit pig of claim 1 wherein the lead support is comprised of brush bristles extending out from the body.

6. The conduit pig of claim 1 wherein the brush bristles are arranged as pencil brushes.

7. The conduit pig of claim 1 wherein the body includes a first subcomponent on which the lead support is mounted and a second subcomponent on which the annular diaphragm is supported and the first subcomponent is releasably coupled to the second subcomponent.

8. The conduit pig of claim 1 further comprising a second structure coupled to the body of the seal, the second structure configured for conduit cleaning and/or sealing with a conduit inner wall.

9. The conduit pig of claim 8 wherein the second structure is mounted on a core releasably connectable to the body such that the conduit pig is customizable by removing and replacing the second structure with another second structure.

10. The conduit pig of claim 8 wherein the second structure is a conduit cleaning brush including bristles installed secantially on a brush core body.

11. The conduit pig of claim 10 wherein a first portion of the bristles are secantially oriented in a clockwise position and a second portion of the bristles are secantially oriented in a counter-clockwise position.

12. The conduit pig of claim 8 wherein the second structure is a conduit cleaning brush including brush bristles raked forwardly towards a leading end of the conduit pig.

13. A method for pigging a conduit comprising:
    radially compressing a conduit pig, the conduit pig including a central pig body; and
    an annular seal assembly encircling the central pig body, the annular seal including:
        an annular diaphragm having a front side and a rear side;
        a lead support bearing against the front side of the annular diaphragm and having a diameter greater than a diameter across the annular diaphragm; and
        a trailing support bearing against the rear side of the annular diaphragm;
    pushing the conduit pig into the conduit with the annular diaphragm urged into a conical shape about the central pig body and the lead support overlying and positioned radially outwardly of the annular diaphragm to protect the annular diaphragm from wear against an inner wall of the conduit; and
    applying fluid pressure behind the conduit pig to inflate the diaphragm against the lead support and thereby to push the conduit pig through the conduit, while the annular diaphragm is positively supported between the lead support and the trailing support and urged outwards towards the inner wall of the conduit.

14. The method of claim 13, wherein applying fluid pressure pushes the conduit pig with the lead support bearing against an inner wall of the conduit and the annular diaphragm bearing against the lead support and spaced from the inner wall.

15. The method of claim 13 wherein the lead support is comprised of bristles and pushing includes deforming the bristles to bend back away from the leading end and supporting the conduit pig on the bristles against an inner wall of the conduit.

16. The method of claim 13, wherein during pushing, the annular diaphragm is forced by fluid pressure against and is shaped by the lead support.

\* \* \* \* \*